United States Patent
Kaikumaa

(10) Patent No.: US 7,426,187 B2
(45) Date of Patent: Sep. 16, 2008

(54) FALSE SYNC CODE PROTECTION (FSP) DECODING BY SOFTWARE

(75) Inventor: Timo Kaikumaa, Tampere (FI)

(73) Assignee: Nokia Corporation, Espoo (FI)

( * ) Notice: Subject to any disclaimer, the term of this patent is extended or adjusted under 35 U.S.C. 154(b) by 937 days.

(21) Appl. No.: 10/691,457

(22) Filed: Oct. 21, 2003

(65) Prior Publication Data

US 2005/0100088 A1    May 12, 2005

(51) Int. Cl.
*H04J 3/06* (2006.01)
(52) U.S. Cl. .................. 370/252; 370/478; 370/503; 370/520; 725/70; 725/71
(58) Field of Classification Search ............... 370/476, 370/504, 505, 506, 511, 514, 520; 725/70, 725/71
See application file for complete search history.

(56) References Cited

U.S. PATENT DOCUMENTS

| | | | | |
|---|---|---|---|---|
| 4,270,148 A | * | 5/1981 | Adachi | 358/409 |
| 5,696,867 A | * | 12/1997 | Lee | 386/46 |
| 6,119,195 A | * | 9/2000 | Ellis et al. | 710/310 |
| 6,310,897 B1 | * | 10/2001 | Watanabe et al. | 370/522 |
| 6,697,989 B1 | * | 2/2004 | Maeda et al. | 714/755 |
| 6,888,569 B2 | * | 5/2005 | Fox et al. | 348/239 |
| 2004/0252332 A1 | * | 12/2004 | McCoog et al. | 358/1.15 |

* cited by examiner

*Primary Examiner*—Chi H. Pham
*Assistant Examiner*—Shick Hom
(74) *Attorney, Agent, or Firm*—Ware, Fressola, Van der Sluys & Adolphseon

(57) ABSTRACT

This invention describes a false sync code protection (FSP) decoding technique by software for removing padding binary numbers from video data signals in electronic devices such as camera-phones. These padding binary numbers (e.g., a byte $10100101_2$) are encoded in the video data signal. The invention describes a fast method for carrying out the decoding process using a predetermined criterion without need for separately comparing the received data using bit-by-bit process, and thus significantly reducing the number of processor instructions compared to the conventional bit-by-bit method. For the presented example these instructions are executed for every stand-alone zero byte found within e.g. JPEG data, which leads to considerable savings in execution time, especially if several JPEG images are taken and processed consecutively.

22 Claims, 2 Drawing Sheets

FALSE SYNC CODE PROTECTION (FSP) DECODING BY SOFTWARE

FIELD OF THE INVENTION

This invention generally relates to video signal processing in electronic devices and more specifically to false sync code protection (FSP) decoding by software for removing padding binary numbers from video data signals.

BACKGROUND OF THE INVENTION

1. Field of Technology and Background

With very few exceptions, most of camera-phones manufactured today have used a serial data bus for transferring the image information from the camera to the phone engine containing memory and processors for storing, showing, processing and/or sending the images further. A block called compact camera port (CCP) is the block on the phone engine side that connects the phone engine to the aforementioned serial bus (sometimes called CCP bus), wherein said serial bus typically consists of differential clock lines (clock+ and clock−) and differential data lines (data+, data−) only.

Cameras in camera-phones in many respects behave like video cameras and output images continuously. In order to provide synchronization of these image frames, e.g., to know where one single image starts and where it ends, synchronization codes are used. The synchronization codes are typically 32-bit patterns which need to be univocal. Each synchronization code must be different from others, and the synchronization codes must not appear within the image data itself (otherwise the image data would be treated as a synchronization code and not as an image data). The CCP block is a hardware block that compares incoming data in a bit-by-bit manner to detect the synchronization codes. The CCP block has a serial first in-first out (FIFO) buffer for 32 bits. The bits received from the camera go through the FIFO buffer and, when a synchronization code is detected, the bits belonging to that synchronization code are removed and the state machine in the CCP block is updated accordingly.

Currently, four synchronization codes have been defined as follows:
Frame Start Code, $FF000002_{16}$, is inserted by the camera to the beginning of each image frame,
Frame End Code, $FF000003_{16}$, is inserted by the camera to the end of each image frame,
Line Start Code, $FF000000_{16}$, is inserted by the camera to the beginning of each line within an image, and
Line End Code, $FF000001_{16}$, is inserted by the camera to the end of each line within an image.

The data on the CCP bus is sent bytewise least significant bit (LSB) first, so for example the Frame Start Code is a binary number ($1^{st}$ bit) 1111 1111 0000 0000 0000 0000 0100 $0000_2$ ($32^{nd}$ bit).

2. Problem Formulation

The problem rises from the fact that the synchronization codes must not appear within the image data itself as stated above. Cameras are starting to support a joint photographic expert group (JPEG) output format, in other words they can compress the image into the JPEG format before sending it, thus reducing the bandwidth and storage memory requirements. However, the JPEG format has been standardized and there is no way to prevent the occurrence of the synchronization codes inside JPEG data. Therefore it is unavoidable that the synchronization code mistakenly appears bitwise within the video data signal. For example if data $F8070000F8_{16}$ is sent, (each byte is sent LSB first), it appears on the CCP bus as 0001 1111 1110 0000 0000 0000 0000 0000 0001 $1111_2$ with the underlined part corresponding to the bit pattern of the Line Start Code. In this situation the CCP block will mistakenly find and remove a look-alike Line Start Code in the video data signal.

Therefore, in order to successfully transfer, for example, JPEG data over the CCP block in the phone engines, channel coding known as a false sync code protection (FSP) must be used to change the JPEG data before it is sent. And similarly, the data should be properly decoded once it is received. The method for FSP encoding which is currently used or to be used in cameras in the visible is summarized below as follows.

The camera monitors the JPEG data it is producing. Whenever one of the bit patterns shown in Table 1 appears, the camera adds the padding byte, the number $A5_{16}$ (or 1010 $0101_2$), in its output after a zero byte n, thus breaking a bit pattern that can generate a synchronization code.

TABLE 1

| Bit patterns ("?" means that it can be "1" or "0"). | | |
|---|---|---|
| byte n − 2 | byte n − 1 | byte n |
| ???? $????_2$ | 1111 $1111_2$ | 0000 $0000_2$ |
| 1??? $????_2$ | 0111 $1111_2$ | 0000 $0000_2$ |
| 11?? $????_2$ | 0011 $1111_2$ | 0000 $0000_2$ |
| 111? $????_2$ | 0001 $1111_2$ | 0000 $0000_2$ |
| 1111 $????_2$ | 0000 $1111_2$ | 0000 $0000_2$ |
| 1111 $1???_2$ | 0000 $0111_2$ | 0000 $0000_2$ |
| 1111 $11??_2$ | 0000 $0011_2$ | 0000 $0000_2$ |
| 1111 $111?_2$ | 0000 $0001_2$ | 0000 $0000_2$ |

Once the data is received in the phone engine, the extra $A5_{16}$ padding bytes need to be removed and FSP decoding must be performed. Note that not all $A5_{16}$ bytes of the received data must be removed, because $A5_{16}$ bytes will appear in the original JPEG data as well and those bytes must be left intact while decoding.

Currently, there is no hardware to remove the inserted $A5_{16}$ padding bytes on the phone engine side, so the decoding of the JPEG data has to be done by software (for example within the camera driver).

3. Prior Art Solutions

In Nokia phone 3650 the problem was circumvented by adding 2 padding bytes for each 2 bytes of the JPEG data. Therefore the decoding process was very simple, but at the expense of bandwidth and memory requirements (e.g., for 30 kilobytes of the JPEG data, 60 kilobytes need to be sent over the CCP block).

A simple solution to the problem outlined above can be comparing the received FSP encoded data byte-by-byte to the eight patterns given in Table 1. However, this is a slow solution, even if it is optimized so that initially only zero bytes are being looked for, and once found, the two previous bytes are taken into closer inspection. This is because JPEG data contains a considerable amount of zero bytes, and all the eight comparisons would require that the unessential bits are first masked out before comparison can be made (each of the patterns requiring different bits to be masked out). Using this byte-by-byte comparison approach it was estimated that the comparison would take 141 instructions for comparing the input data against all eight patterns.

SUMMARY OF THE INVENTION

The object of the present invention is to provide a technique for false sync code protection (FSP) decoding by software for removing padding binary numbers from video data signals in electronic devices such as camera-phones.

According to a first aspect of the present invention, a method for false sync code protection (FSP) decoding of a video data signal encoded with padding binary numbers comprises the steps of: examining the video data signal in a byte-by-byte manner to identify a predetermined binary number; determining if the padding binary number follows the predetermined binary number based on a predetermined criterion; and removing the padding binary number next to the predetermined binary number, if the predetermined criterion is met. Still further, the padding binary number may be an 8-bit binary number, which is equivalent to one byte. Also further, if the predetermined criterion is met, the method further comprises the step of examining the video data signal in the byte-by-byte manner starting with a byte next to the removed padding binary number to identify a further predetermined binary number. Yet still further, if the predetermined criterion is not met, the method may further comprise the step of examining the video data signal in the byte-by-byte manner starting with a byte next to the predetermined binary number to identify a further predetermined binary number.

According to a second aspect of the present invention, a method for false sync code protection (FSP) decoding of a video data signal encoded with padding bytes comprises the steps of: examining the video data signal in a byte-by-byte manner to identify a zero byte; determining if the padding byte follows the zero byte based on a predetermined criterion; and removing the padding byte next to the zero byte, if the predetermined criterion is met. Further, the padding byte may be a binary number 10100101 or equivalently a hexadecimal number A5.

According still further to the second aspect of the present invention, if the predetermined criterion is met, the method further comprises the steps of: skipping one byte after the removed padding byte; and examining the video data signal in the byte-by-byte manner starting with a byte next to the skipped byte to identify a further zero byte.

In further accord with the second aspect of the invention, if the predetermined criterion is not met, the method further comprises the steps of: skipping one byte after the zero byte; and examining the video data signal in the byte-by-byte manner starting with a byte next to the skipped byte to identify a further zero byte.

Still further according to the second aspect of the invention, the video data signal is in a joint photographic experts group (JPEG) format and the padding byte is not zero. Further, after the step of examining the video data signal in the byte-by-byte manner to identify the zero byte, the method further comprises the steps of: identifying a value of a byte before the zero byte, said byte before the zero byte is identified as a byte A; and determining if the byte before the zero byte is zero.

Further still according to the second aspect of the invention, wherein the video data signal is in a joint photographic experts group (JPEG) format and the padding byte is not zero, if the byte before the zero byte is zero, the method further comprises the steps of: skipping one byte after the zero byte, and examining the video data signal in the byte-by-byte manner starting with a byte next to the skipped byte to identify a further zero byte.

In further accordance with the second aspect of the invention, wherein the video data signal is in a joint photographic experts group (JPEG) format and the padding byte is not zero, if the byte before the zero byte is not zero, the method further comprises the step of identifying a value of a byte before the byte before the zero byte, said byte before the byte before the zero byte is identified as a byte B. Still further, the method further comprises the steps of: determining a value of a combinational byte equals to a logical OR combination of the bytes A and B, said combinational byte is identified as a byte C=A OR B; determining a value of a first 16-bit or 32-bit binary number, identified as a binary number D, wherein a least significant byte of the binary number D equals to the byte C, and a next byte to the least significant byte of the binary number D equals to the byte A; determining a value of a second 16-bit or 32-bit binary number, identified as a binary number E equals to D+1; and determining a value of a third 16-bit or 32-bit binary number, identified as a binary number F, equals to a logical AND combination of the binary numbers E and D: F=E AND D. Yet still further, if the value of the binary number F is zero, the method further comprises the step of removing the padding byte next to the zero byte.

Yet further still according to the second aspect of the invention, of removing the padding byte next to the zero byte, the method may further comprise the steps of: skipping one byte after the removed padding byte; and examining the video data signal in the byte-by-byte manner starting with a byte next to the skipped byte to identify a further zero byte.

According further to the second aspect of the invention, if the value of the third binary number F is not zero, the method may further comprise the steps of: skipping one byte after the zero byte; and examining the video data signal in the byte-by-byte manner starting with a byte next to the skipped byte to identify a further zero byte.

According to a third aspect of the invention, an electronic device comprises: a camera for generating an encoded video data signal, said encoded video data signal includes padding binary numbers and a synchronization code; means for removing the synchronization code form the encoded video data signal, for providing a video data signal encoded with the padding binary numbers only; and a false sync code protection (FSP) decoding means, responsive to the video data signal, for examining the video data signal in a byte-by-byte manner for identifying a predetermined binary number and for determining if the padding binary number follows the predetermined binary number based on a predetermined criterion.

According further to the third aspect of the invention, the FSP decoding means removes the padding binary number next to the predetermined binary number if the predetermined criterion is met.

In further accord with the third aspect of the invention, the FSP decoding means provides a decoded video signal free of the padding binary numbers.

Further according to the third aspect of the invention, the means for removing the synchronization code may be a compact camera port (CCP) block.

Further still according to the third aspect of the invention, the electronic device is a camera-phone and wherein the FSP decoding means is a part of a phone engine of the camera-phone.

In further accordance with the third aspect of the invention, the padding binary number may be an 8-bit binary number, which is equivalent to one byte.

Still further according to the third aspect of the invention, the padding binary number is a 8-bit binary number, which is equivalent to one byte, and the predetermined binary number is a zero byte. Further still, the FSP decoding means removes the padding byte next to the zero byte if the predetermined criterion is met.

BRIEF DESCRIPTION OF THE DRAWINGS

For a better understanding of the nature and objects of the present invention, reference is made to the following detailed description taken in conjunction with the following drawings, in which.

BEST MODE FOR CARRYING OUT THE INVENTION

The present invention provides a technique for false sync code protection (FSP) decoding by software for removing padding bytes or more generally padding binary numbers from an encoded video data signal in electronic devices (e.g. camera-phones) based on a predetermined criterion. These padding bytes are encoded in the video data signal as described above. This invention describes a fast method for carrying out the decoding process, without the need to separately compare the received data for each of the 8-bit patterns of Table 1. The method described according to the present invention uses only 4 processor (e.g., Nokia phone engine uses ARM processors) instructions for accomplishing said decoding.

To be precise, the core of the algorithm that detects the situation where the FSP padding byte has been used, takes 4 instructions. A necessary loop structure around it takes some additional instructions, but other competitive approaches also require these additional instructions, therefore said additional instructions are not considered when the present invention is compared with competitive techniques.

Using the byte-by-byte comparison approach described above as a benchmark, the method disclosed in the present invention reduces the number of processor instructions needed for the FSP software decoding from 141 to 4. These instructions are executed for every stand-alone zero byte found within the JPEG video data signal, so the present invention provides considerable savings in execution time, especially if several JPEG images are taken and processed consecutively.

Figure 1:
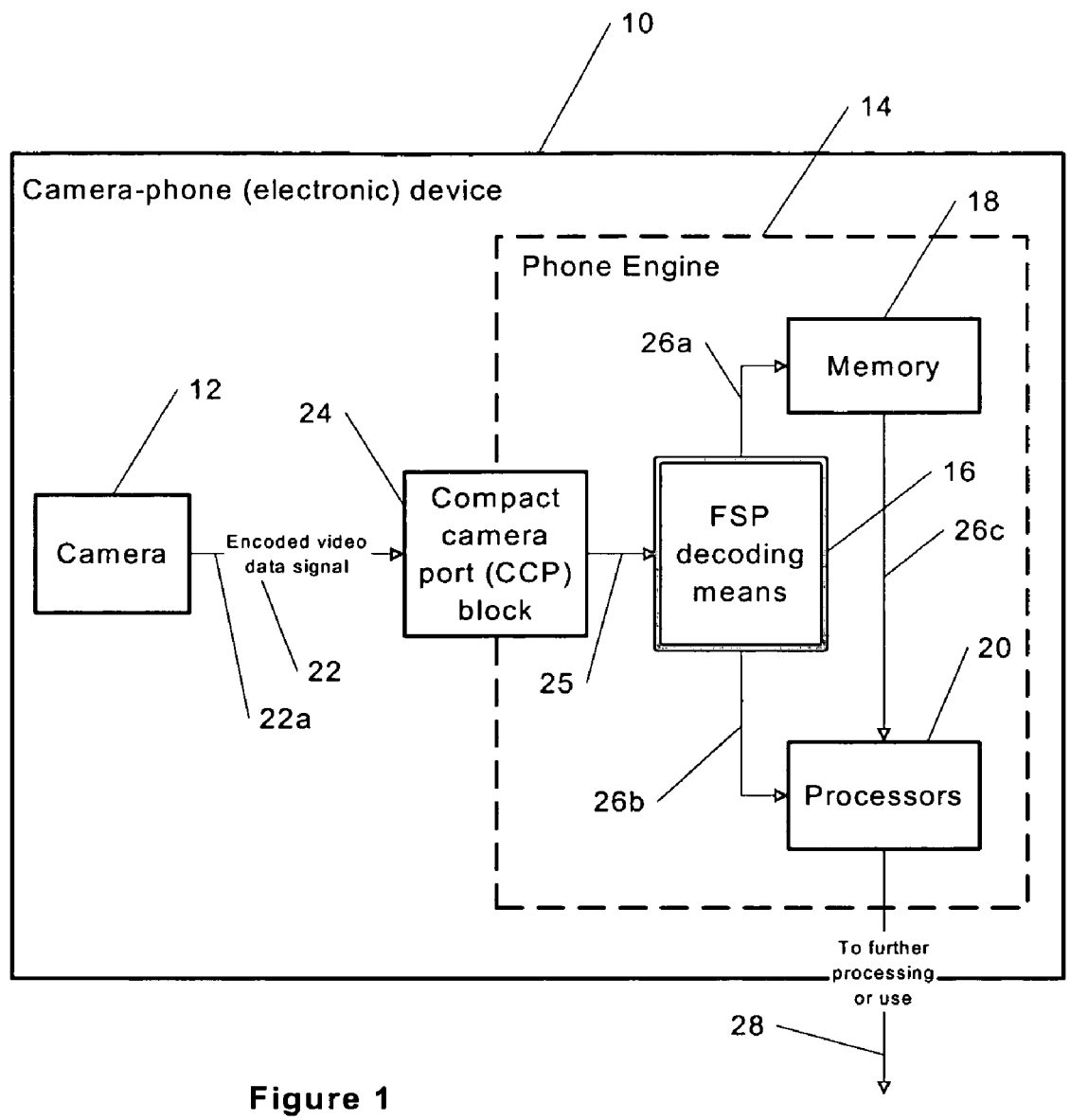
FIG. 1 is a block diagram representing an example of a camera-phone (electronic device) utilizing FSP decoding, according to the present invention.

FIG. 1 is a block diagram representing only one example among many others of an electronic device such as a camera-phone 10 utilizing FSP decoding, according to the present invention. Camera 12 generates an encoding video data signal 22, e.g., in JPEG format, using a synchronization code and padding bytes as described above in Parts 1 and 2 of the Background of the Invention section. In this particular example the padding byte used is a hexadecimal number $A5_{16}$ (or binary number $10100101_2$). However, in a broader sense, the padding byte can be a binary number of any value and containing any number of bits appropriate for a particular application. The encoded video data signal 22 is provided through a serial bus 22a to a compact camera port (CCP) block 24, which is the block on the phone engine 14 side that connects the phone engine 14 to the serial bus 22a (which sometimes called CCP bus).

Said CCP bus 22a typically consists of differential clock lines (clock+ and clock−) and differential data lines (data+, data−) only and the CCP block is responsible for removing the synchronization code from the encoded video data signal 22 and generating a video data signal 25 with the padding bytes (or padding binary numbers) intact. In the presented example of FIG. 1, the CCP block 24 has a serial first in-first out (FIFO) buffer for 32 bits. The bits received from the camera 12 go through the FIFO buffer and, when the synchronisation code is detected, the bits belonging to that synchronisation code are removed and the state machine in the CCP block 24 is updated accordingly. Thus, the CCP block 24 is one example among others of the means for removing the synchronization code.

The video data signal 25 (with the removed synchronization code but still with the intact padding bytes) is provided to a false sync code protection (FSP) decoding means 16, which is a software means located in the presented example in the phone-engine 14. Said FSP decoding means (16) removes the padding bytes from the video data signal 25 based on the predetermined criterion, according to the present invention and as explained in detail in regard to FIG. 2 below. Removal of the synchronization code from the encoded video signal 22 in the present example is performed before the removal of the padding bytes, according to the present invention. After complete decoding by the FSP decoding means 16, the decoded video data signals 26a and 26b are sent to a memory 18 and processors 20 of the phone engine 14 for storing, showing, processing and/or sending the further video data signals 26c and 28 to further processing or use.

Although, according to the preferred embodiment of FIG. 1, the present invention uses the camera 12 producing the JPEG encoded video data signal 22, this invention can be used with any kind of device that is connected to the serial bus 22a and produces data in a different format than JPEG. Furthermore, said device can use different types of synchronization codes than the one used in the preferred embodiment of the present invention. Currently however, there are no other devices than cameras that could be connected to the serial bus 22a, and among various output formats of cameras, currently only JPEG data requires special measures such as inserting padding bytes (or padding binary numbers).

Figure 2:
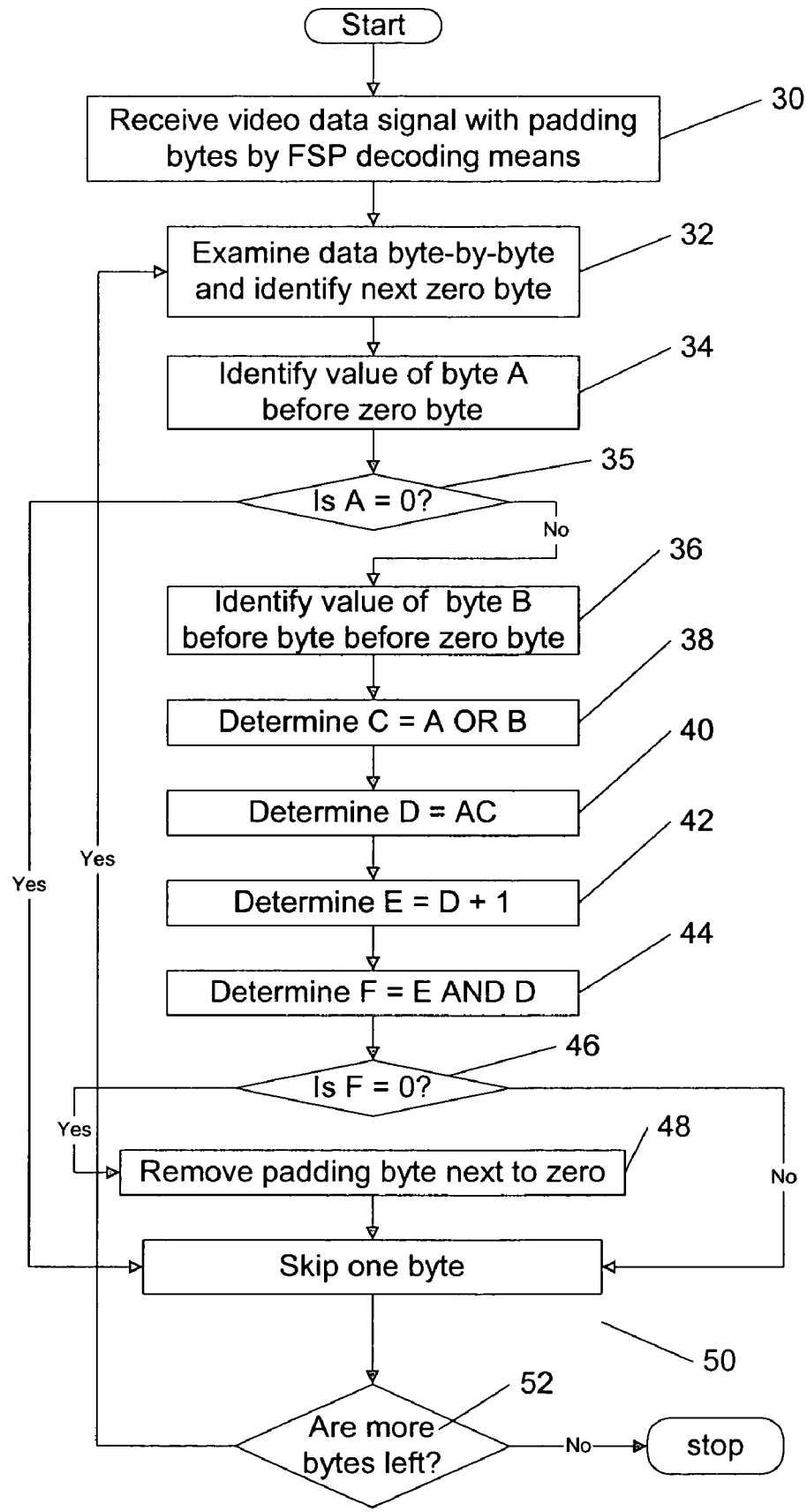
FIG. 2 shows a flow chart for an FSP decoding of a JPEG encoded video data signal, according to the present invention.

FIG. 2 shows a flow chart for the FSP decoding by software for JPEG encoded video data signal, according to the present invention. The FSP decoding is presented in the preferred embodiments of the present invention, wherein the padding bytes are inserted in the video data signal 25 after one of the bit patterns presented in Table 1. The flow chart of FIG. 2 only represents one possible scenario among many others. In a method according to the present invention, in a first step 30, the video data signal 25 with the removed synchronization bytes but with the intact padding bytes is provided to the FSP decoding means 16. In a next step 32, the FSP decoding means 16 examines the video data signal 25 byte-by-byte for identifying a zero byte. Once the zero byte is found, it is assumed that the values of two previous bytes are still available in the registers of the phone engine 14 processor. Therefore, in a next step 34, the value of a byte before the zero byte is identified and designated as a byte A by the FSP decoding means 16. In a next step 35, it is ascertained whether the byte A equals zero. If that is the case, the process goes to step 50 described below. If, however, the byte A is not zero, in a next step 36, the value of a byte before the byte before the zero byte is identified and designated as a byte B by the FSP decoding means 16. If the found zero byte is among the two first bytes of the video data signal 25, the algorithm will behave as if there are additional zeros in front of the input data, i.e., if the first byte of the video data signal 25 is zero, the algorithm behaves as if A and B are zeros, and if the second byte of the video data signal 25 is zero, the algorithm behaves as if B is zero.

In a next step 38, it is determined by the FSP decoding means 16 the value of a combinational byte equals to a logical OR combination of the bytes A and B, said combinational byte is identified as a byte C=A OR B. Step 38 requires a first ARM processor instruction. In a next step 40, it is determined by the FSP decoding means 16 the value of a first 16-bit or 32-bit binary number, identified as a binary number D, wherein a least significant byte of the binary number D equals to the byte C, and a next byte to the least significant byte of the binary number D equals to the byte A, such that the binary number D=AC. Step 40 requires a second ARM processor instruction. In a next step 42, it is determined by the FSP decoding means 16 the value of a second 16-bit or 32-bit binary number, identified as a binary number E equals to D+1. Step 42 requires a third ARM processor instruction. In a next step 44, it is determined by the FSP decoding means 16 the value of a third 16-bit or 32-bit binary number, identified as a binary number F, equals to a logical AND combination of the binary numbers E and D: F=E AND D. Step 44 requires a fourth ARM processor instruction, which is the last needed instruction for the presented example.

In a next step 46, it is ascertained whether the binary number F equals to zero. If that is not the case, the process goes to step 50 described below. If, however, the binary number F equals to zero, in a next step 48, the byte next to the zero byte is identified as the padding byte $A5_{16}$ and is removed form the video data signal 25 by the FSP decoding means 16. In a next step 50, one byte is skipped, because having 2 consecutive zero bytes is not a signature of the padding byte (see step 35). For the presented example, skipping one byte after the zero byte is warranted because two consequent zero bytes do not constitute a padding byte-like situation (see step 35). However, in general, if a different algorithm is used for inserting a padding binary number, a predetermined binary number can be used instead of the zero byte and a skipping procedure can be modified depending on the particular algorithm used for a particular application. Thus generally, the step 50 is an optional step and may not be needed if other algorithms for identifying the padding bytes are used. In a next step 52, it is ascertained whether more bytes (or at least one more byte) which are not decoded yet from the padding byte are left in the video data signal 25. If that is not the case, the process stops. If, however, there are more bytes in the video data signal 25 to be decoded, the process goes back to the step 32.

It should be noted that according to the present invention, when comparing values against zero, it is not necessary to use comparison instructions because ARM can set the zero flag automatically after each instruction if the result of that instruction was zero. Thus only 4 processor instructions for accomplishing the removal of the padding bytes from the video data signal 25 are required, which is significantly less than using conventional methods, as stated above.

What is claimed is:

1. A method, comprising:
    examining a video data signal encoded with padding binary numbers in a byte-by-byte manner to identify a predetermined binary number,
    determining if a padding binary number follows the predetermined binary number based on a predetermined criterion,
    removing the padding binary number next to the predetermined binary number, if the predetermined criterion is met, for false sync code protection decoding of said video data signal, and
    examining the video data signal in the byte-by-byte manner starting with a byte next to the removed padding binary number to identify a further predetermined binary number, if the predetermined criterion is met.

2. The method of claim 1, wherein the padding binary number is an 8-bit binary number, which is equivalent to one byte.

3. The method of claim 1, if the predetermined criterion is not met, further comprising:
    examining the video data signal in the byte-by-byte manner starting with a byte next to the predetermined binary number to identify a further predetermined binary number.

4. A method, comprising:
    examining a video data signal encoded with padding bytes in a byte-by-byte manner to identify a zero byte,
    determining if a padding byte follows the zero byte based on a predetermined criterion, and
    removing the padding byte next to the zero byte, if the predetermined criterion is met, for false sync code protection (FSP) decoding.

5. The method of claim 4, wherein the padding byte is a binary number 10100101 or equivalently a hexadecimal number A5.

6. The method of claim 4, if the predetermined criterion are met, further comprising:
    skipping one byte after the removed padding byte, and
    examining the video data signal in the byte-by-byte manner starting with a byte next to the skipped byte to identify a further zero byte.

7. The method of claim 4, if the predetermined criterion is not met, further comprising:
    skipping one byte after the zero byte, and
    examining the video data signal in the byte-by-byte manner starting with a byte next to the skipped byte to identify a further zero byte.

8. The method of claim 4, wherein the video data signal is in a joint photographic experts group format and the padding byte is not zero.

9. The method of claim 8, after examining the video data signal in the byte-by-byte manner to identify the zero byte, further comprising:
    identifying a value of a byte before the zero byte, said byte before the zero byte is identified as a byte A, and
    determining if the byte before the zero byte is zero.

10. The method of claim 9, if the byte before the zero byte is zero, further comprising:
    skipping one byte after the zero byte, and
    examining the video data signal in the byte-by-byte manner starting with a byte next to the skipped byte to identify a further zero byte.

11. The method of claim 9, if the byte before the zero byte is not zero, further comprising:
    identifying a value of a byte before the byte before the zero byte, said byte before the byte before the zero byte is identified as a byte B.

12. The method of claim 11, further comprising:
    determining a value of a combinational byte equals to a logical OR combination of the bytes A and B, said combinational byte is identified as a byte C=A OR B,
    determining a value of a first 16-bit or 32-bit binary number, identified as a binary number D, wherein a least significant byte of the binary number D equals to the byte C, and a next byte to the least significant byte of the binary number D equals to the byte A,
    determining a value of a second 16-bit or 32-bit binary number, identified as a binary number E equals to D+1, and
    determining a value of a third 16-bit or 32-bit binary number, identified as a binary number F, equals to a logical AND combination of the binary numbers E and D: F=E AND D.

13. The method of claim 12, if the value of the binary number F is zero, further comprising:
    removing the padding byte next to the zero byte.

14. The method of claim 13, further comprising:
    skipping one byte after the removed padding byte, and
    examining the video data signal in the byte-by-byte manner starting with a byte next to the skipped byte to identify a further zero byte.

15. The method of claim 12, if the value of the third binary number F is not zero, further comprising:
skipping one byte after the zero byte, and
examining the video data signal in the byte-by-byte manner starting with a byte next to the skipped byte to identify a further zero byte.

16. An electronic device, comprising:
a camera configured to generate an encoded video data signal, said encoded video data signal includes padding binary numbers and a synchronization code;
means for removing the synchronization code from the encoded video data signal, configured to provide a video data signal encoded with the padding binary numbers only; and
a false sync code protection decoding means, responsive to the video data signal, configured to examine the video data signal in a byte-by-byte manner for identifying a predetermined binary number and for determining if the padding binary number follows the predetermined binary number based on a predetermined criterion, wherein said false sync code protection decoding means is configured to remove the padding binary number next to the predetermined binary number if the predetermined criterion is met.

17. The electronic device of claim 16, wherein said false sync code protection decoding means configured to provide a decoded video signal free of the padding binary numbers.

18. The electronic device of claim 16, wherein the means for removing the synchronization code is a compact camera port block.

19. The electronic device of claim 16, wherein said electronic device is a camera-phone and wherein the false sync code protection decoding means is a part of a phone engine of the camera-phone.

20. The electronic device of claim 16, wherein the padding binary number is an 8-bit binary number, which is equivalent to one byte.

21. The electronic device of claim 16, wherein the padding binary number is a 8-bit binary number, which is equivalent to one byte, and the predetermined binary number is a zero byte.

22. The electronic device of claim 21, wherein said false sync code protection decoding means) is configured to remove the padding byte next to the zero byte if the predetermined criterion is met.

* * * * *